No. 768,714. Patented August 30, 1904.

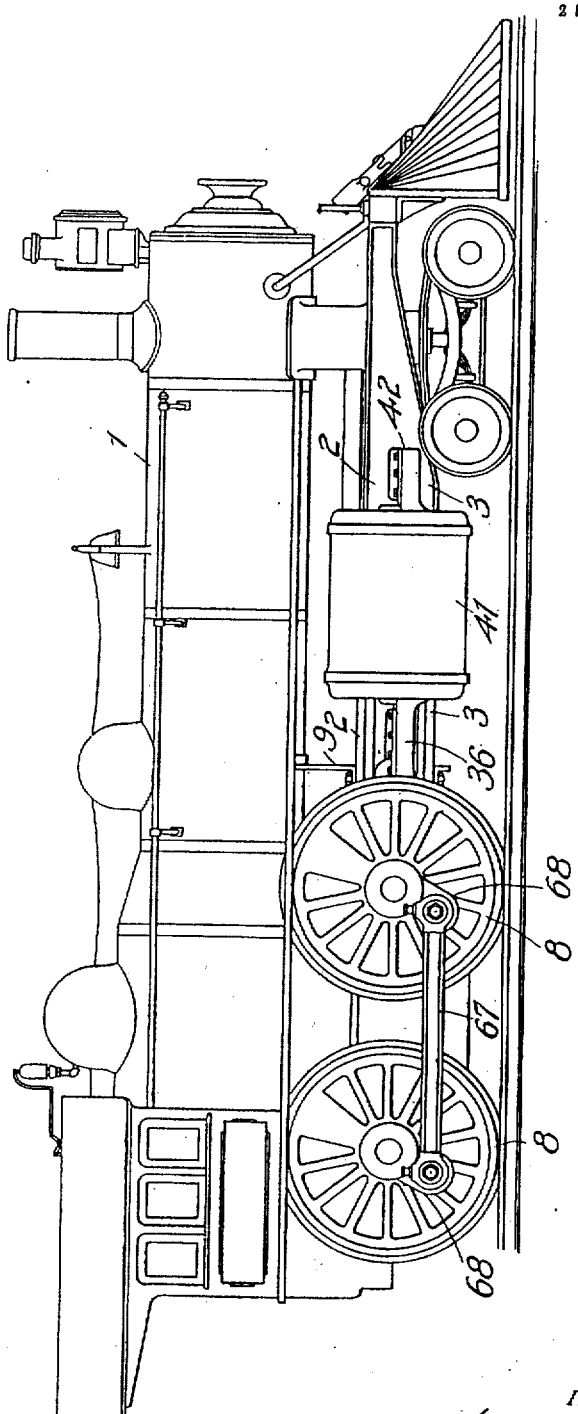

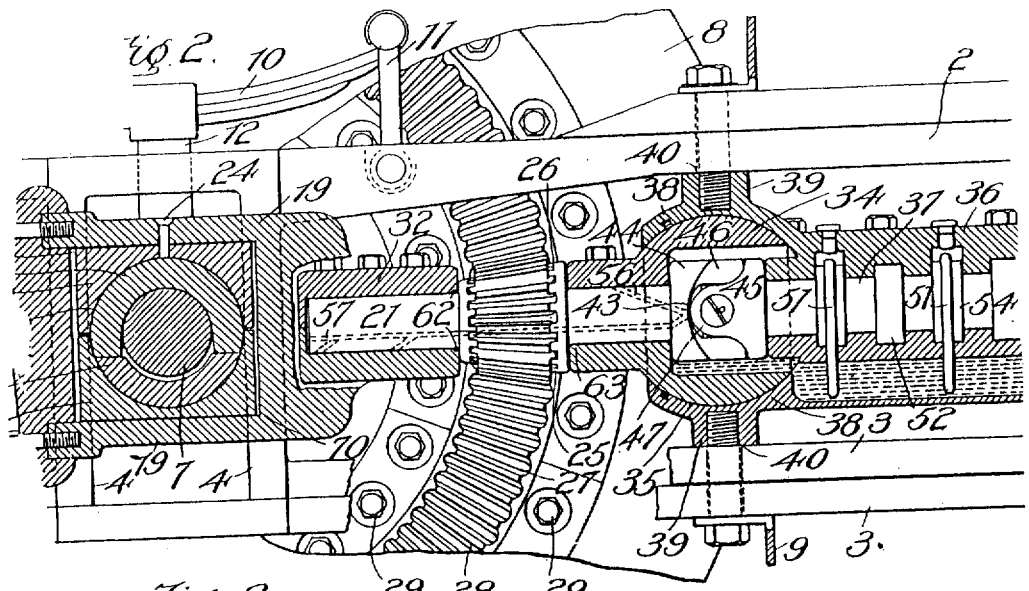
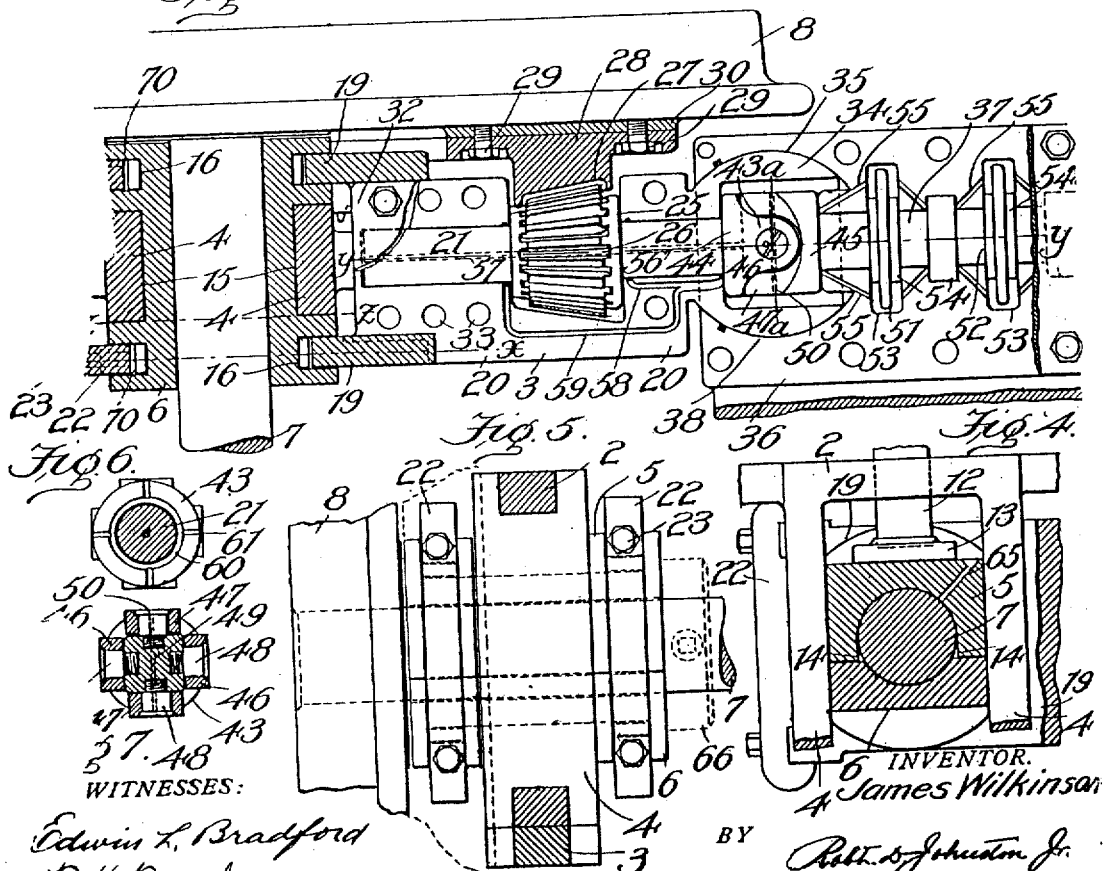

UNITED STATES PATENT OFFICE.

JAMES WILKINSON, OF BIRMINGHAM, ALABAMA, ASSIGNOR TO THE WILKINSON STEAM TURBINE COMPANY, OF BIRMINGHAM, ALABAMA, A CORPORATION OF ALABAMA.

TURBINE-DRIVEN LOCOMOTIVE OR VEHICLE.

SPECIFICATION forming part of Letters Patent No. 768,714, dated August 30, 1904.

Application filed May 13, 1904. Serial No. 207,769. (No model.)

*To all whom it may concern:*

Be it known that I, JAMES WILKINSON, a citizen of the United States, residing at Birmingham, in the county of Jefferson and State of Alabama, have invented new and useful Improvements in Turbine-Driven Locomotives or Vehicles, of which the following is a specification.

My invention relates to improvements in traction engines or vehicles adapted to be propelled by an elastic-fluid turbine of any desired construction and in the driving mechanism for transmitting the rotary motion of the turbine to a wheel or axle.

In my preferred construction I will mount the turbine or turbines upon the main frame of the locomotive adjacent to the points where the cylinders are now located, disposing them at right angles to the axle of the main driving-wheels. As applied to traction cars and vehicles, the turbine may be supported in any desirable manner upon a truck or from the body of the vehicle.

It is a further object of my invention to improve the driving mechanism for transmitting motion from the motor on the main frame or truck of the locomotive or car to one of the traction-wheels or to an axle.

In carrying my invention into effect I provide as a preferable arrangement a pinion-shaft mounted in a suitable bearing which is pivotally and adjustably journaled on an axle and which is connected by a ball-and-socket joint to the bearing-frame for the motor-driven shaft, which latter is connected by a universal joint to the pinion-shaft. The bearing for the motor-shaft is preferably mounted rigidly upon the main frame of a locomotive, and the flexible and adjustable connections for the pinion-shaft bearings will permit of a free relative movement between the frame and axle.

In describing the preferred embodiment of my transmission means as applied to driving a locomotive-engine reference is made to the accompanying drawings, which form a part of this specification, and in which—

Figure 1 is a side elevation of a locomotive-engine provided with my transmission-gears and a turbine-motor. Fig. 2 is a vertical sectional view through the flexible shaft-bearing along the line $x\ x$, Fig. 3, and partly through the yoke for the bearing along the line $y\ y$, also of Fig. 3. Fig. 3 is a top plan view of the pinion-shaft bearing with the cap removed and the main journal shown in horizontal section. Fig. 4 is a cross-sectional view through the line $z\ z$, Fig. 3. Fig. 5 is a top plan view of the main journal-bearing. Fig. 6 is an end view of the universal joint of the driving-shaft, and Fig. 7 is a transverse sectional view through the joint on the line $a\ a$, Fig. 3.

Similar reference-numerals refer to the same parts throughout.

In describing the specific application of my invention illustrated in the drawings, to which, however, I do not limit myself, the locomotive 1 is provided with a main frame comprising upper and lower portions 2 and 3, respectively, formed integral and connected by cross portions 4, constituting side guides for the shaft journal-brasses 5 and 6, which rest upon the axle 7, connecting the front pair of drive-wheels 8. A saddle 9, made of boiler-steel, passes around the main frame and has a turned-up edge bolted to the boiler, which is supported upon the springs 10, connected at their inner ends by pivoted links 11 to the main frame 2 and at their center mounted in a suitable support 12, which passes through a guide in frame 2 and rests upon a shoe 13, bearing upon journal-brass 5. These journals are mounted on the axle 7 adjacent to each wheel 8 and comprise an upper brass 5, which surrounds the major portion of the axle and rests upon the lower brass 6, which hugs the lower portion of the axle closely, whereas the upper brass leaves a clearance at the points 14 to enable it to be dropped over the shaft. These brasses are squared on each side opposite their central portions and provided with vertical recesses 15, in which the side guides 4 are disposed, and at each end they are turned at 16 to provide a circular inner bearing, Fig. 2, upon which are pivotally mounted two narrow brasses 17 and 18, whose outer faces are squared and seated in the yokes 19 of the bearing-frame 20 for the pinion-shaft 21. The yoke-frames have an endwise movement on brasses 17 and 18 and are connected at their outer ends by caps 22, which are held in position by cap-screws 23. An oil-opening 24 passes through the upper yoke-arm and supplies lubricant for the yoke and brasses. It will be noted in Fig. 2 that these yokes and the brasses 17 and 18 can move around the inner brasses and the axle as a pivot, so that the frame 20 is radially disposed and movable concentric with the wheel 8 on its pivot.

The pinion-shaft 21 has integral therewith or keyed thereto at an intermediate point a bevel-pinion 25, provided with half-shrouded teeth 26, which mesh with a circular row of correspondingly-shrouded teeth 27, formed on a segmental ring 28, flanged on each side and securely connected by cap-screws 29 to a circular shoulder 30 on the inner side of wheel 8. This ring projects within the bearing-frame 20, which is cut away to leave the pinion free, and thus leaving bearing-sections for each end of the shaft 21 and a connecting-web 31 between them. A cap 32 is bolted or otherwise secured to the bearing 20, which is provided with suitable holes 33 for the reception of screws or bolts. The outer ends of the bearing 20 and cap 32 are enlarged and shaped to form the ball 34 of a ball-and-socket joint 35, by means of which the movable bearing for the pinion-shaft is connected to the bearing 36 for the motor-driving shaft 37. The bearing 36 is formed in two parts, whose inner ends are enlarged to form the socket 38, which surrounds the ball 34 of the joint 35. Each section of the socket 38 is provided with a boss 39, provided with a threaded opening 40 and adapted to fit closely between sections 2 and 3 of the main frame 2. Cap-screws pass through these portions of the main frame and enter the openings 40, so that the socket is firmly and rigidly connected to the main frame. The other end of the bearing 36 is rigidly connected to or formed integral with a head of the turbine 41, through which the shaft 37 extends, and is supported in a bearing 42 at the other end thereof. This turbine or motor is also rigidly mounted on the main frame, and the driving-shaft 37 will therefore be incapable of any movement independent of the main frame. Since the pinion-shaft 21 is connected to the axle 7, which the necessity of the case requires to be mounted on springs and which will therefore be capable of vertical and oscillatory movements in the plane of its vertical movement, it follows that the ball-and-socket joint 35 between the bearing-frames for the movable shaft 21 and the fixed shaft 37 is necessary, and a universal connection will be required between said shafts. I recess the ball 34 to receive this universal joint 43, connecting the pinion-shaft 21 with the driving-shaft 37, which joint may be of any desired construction, but preferably comprises two circular heads 44 and 45, each having two oppositely-disposed curved lips 46 and 47, respectively, which are loosely interlocked and connected by cap-screws 48 to an inner square block 49. The body portions of the screws are enlarged and form pivots for the several lips. Pins 50 pass eccentrically through opposite screws 48 and block 49 and lock the screws against disengagement. The lower portion of the bearing 36 is recessed to form an oil-reservoir, which communicates with the recess in the ball 34 and also supplies lubricant by oil-rings 51 to the thrust-bearings 52 for shaft 37. These bearings are formed by recessing the bearing 36 at 53 and providing collars 54, rigid on the shaft. Oil-passages 55 connect these recesses with each other and the end recess with the bearing for the head 45. Oil-ducts 56 and 57 lead through the center of head 44 and diagonally through the shaft 21 to supply lubricant by centrifugal action to the bearing-sections for the pinion-shaft and by means of ducts 58 and 59 and a circular groove 60 and radial grooves 61 in the face of head 44 I am able to draw off by centrifugal action the oil from the circular passages 62 and 63 around the inner ends of the bearing-sections. I thus secure a proper circulation of the lubricant essential to the successful operation of the driving mechanism. An oil-passage 65 supplies lubricant to the main journal-bearings.

The mechanism which I have thus described in detail may be duplicated for each of the driving-wheels on axle 7; but in case it is desired to drive but one of the wheels I will use a thrust-collar 66 on axle 7, which bears against the main journal-bearing and counteracts the tendency of the gears in driving-wheel 8 to move it outwardly. I have shown the locomotive provided with two driving-wheels on each side, in which case the parallel rod 67 will connect the cranks 68 on the wheels by crank-pins 69.

My transmission-gearing will possess the same advantages when utilized to transmit motion from a wheel to a dynamo or other machine upon the truck or main frame of a traction-vehicle.

The advantages of a rotary motor for traction purposes have long been recognized, and in view of the limitations of the reciprocating steam-engine for high speeds it has been sought to utilize rotary engines to replace them. The elastic-fluid turbine as a species of rotary motor is capable of developing any desired power and speed of rotation, and being impact in structure it may be readily applied in place of the present driving-cylinders.

The successful application of a steam-turbine to drive a locomotive-engine makes it possible for steam to successfully compete with electricity as a driving means, and it is with this object in view that I have developed the present application of my turbine, which may be of the type shown and described in patents issued to me and which may be governed in any suitable manner. In utilizing the turbine to drive a locomotive the former is mounted in the manner hereinbefore described and upon the admission of motor fluid thereto will drive the main shaft 37. The shaft 21 through the universal connection will be driven by the turbine-shaft and through the pinion 25 will transmit its motion to the wheel 8 by means of the circular beveled rack 27 on the driving-wheel, whose teeth mesh with the pinion. As the axle 7 moves up and down or rocks the pinion-shaft will maintain its true radial position thereto, and accordingly its proper mesh with teeth 27, since its bearing-frame is pivotally mounted on the same axis as wheel 8. There will, however, be a slight sliding movement of the yoke on the brasses 17 and 18, due to the latter moving tangentially to the arc of the yoke's swing. I provide for this sliding movement by leaving sufficient clearance at 70 between the yoke and cap and the sides of the interposed brasses. This movement of the frame 20 will cause a slight sliding movement at the teeth of the gears, which, however, is very small and may be compensated by increasing the room between the shrouds and teeth at their outer ends. In driving forward the tendency of the pinion 25 to climb up on the circular beveled rack 27 will relieve a portion of the strain on the main journal-bearings, due to the lifting action exerted against the lower brasses 6 through the yoke.

By mounting the supporting-frame for the gear-shaft upon a journal of the main axle I avoid the disadvantages of having to lubricate its frame-bearing.

Though I have described my invention with particular view to its application for a locomotive, I do not desire to limit myself, since the turbine may be utilized to drive any character of traction-vehicles, and my improvements may be successfully used in connection with any of these different applications.

Having thus described my invention, what I claim as new, and desire to protect by Letters Patent, is—

1. In a driving mechanism for a traction-engine, the combination with a main frame, wheels, and an axle therefor, a bearing thereon on which said frame is journaled, of a rotary motor mounted on said frame, a power-transmission shaft driven by said motor, a universal joint in said shaft, means to pivotally support the outer end of said shaft on said main-frame journal-bearing, and a pinion on said outer end of said shaft which meshes with teeth on the side of said wheel.

2. In a driving mechanism, the combination with a wheel, an axle therefor, and a frame supported thereon, of a power-transmission shaft mounted on said frame and having an end pivotally and adjustably supported on said axle, a universal joint in said shaft, and means to transmit motion from its pivoted end to said wheel.

3. In a driving mechanism, the combination with a pinion and a shaft therefor, of a rotary element provided with teeth meshing with said pinion, a power-transmission shaft, a universal joint between said shafts, and a bearing-frame for said pinion-shaft pivotally mounted upon and having an adjustable connection with the axis of said driven element, and a flexible connection with a supporting-frame for said power-transmission shaft.

4. In a driving mechanism for a traction-engine, the combination with a wheel, an axle therefor and a frame journaled thereon, of an elastic-fluid turbine mounted on said frame, a shaft driven by said turbine, a toothed element connected by a universal joint to said shaft and meshing with teeth through which motion is imparted to said wheel, and means to support said toothed element comprising a frame flexibly and adjustably supported from said frame and axle, which maintains said element in radial alinement with said wheel throughout changes in its operating position.

5. In a driving mechanism for a traction-engine, the combination with wheels, an axle therefor, and a frame supported on said axle, of an elastic-fluid turbine mounted on said frame, a shaft therefor, a gear-shaft flexibly connected to said latter shaft and meshing with teeth on said wheel, and a support for said gear-shaft which is adjustably connected to said frame and supported so that it maintains said gear-shaft in radial alinement with said wheel independently of changes in the relative operating position of said wheel and turbine.

6. In a driving mechanism for a rotary element, the combination with said element, of an axis therefor, a journal-bearing thereon, a circular row of gear-teeth on said element, a pinion meshing with said teeth, a pinion-support formed at one end with extensions pivotally and adjustably mounted on said journal-bearing, and a power-transmission element which drives said pinion through a flexible connection.

7. In a driving mechanism for a traction-wheel, the combination with a wheel and a journal therefor, of a circular rack mounted on said wheel, a pinion engaging said rack, a pinion-support pivotally mounted on said journal, means to provide for an endwise adjustment on said support, and a power-transmission element having a flexible driving connection with said pinion.

8. In a driving mechanism for a traction-wheel, the combination with a wheel, axle, and journal-bearing thereon, of a circular rack mounted on said wheel, a pinion which engages said rack, a bearing-frame for said pinion formed at one end with yokes which are pivotally mounted on said journal-bearing and capable of a limited endwise movement thereon, a power-transmission shaft, a fixed bearing therefor, a universal joint between said shafts, and a flexible connection between the supporting-frames for the said shafts.

9. In a driving mechanism for a traction-wheel, the combination with a wheel, axle, and journal-bearing thereon, of a circular rack mounted on said wheel, a pinion which engages said rack, a pinion-support formed at one end with arms which are pivotally mounted on said journal-bearing and capable of a limited endwise movement thereon, a power-transmission shaft, a fixed bearing therefor, a universal joint to transmit motion between the pinion and shaft, and a flexible connection between the supporting-frames for the said shafts.

10. In a driving mechanism for a traction-wheel, in combination with a wheel, an axle therefor, and a circular row of bevel-gear teeth mounted on said wheel, of a pinion-shaft mounted in a bearing-frame and disposed radially relative to said wheel, a bevel-pinion on said shaft engaging said circular row of teeth on the wheel, a universal joint between said pinion-shaft and a power-transmission shaft, and means to flexibly support one end of the bearing-frame for said pinion-shaft from a fixed element and to pivotally support the other end on the axle of said wheel.

11. In combination with a traction-engine, a wheel, an axle therefor, and a circular row of teeth mounted on said wheel, of a main frame in regard to which said axle is movable, of a power-transmission shaft, a bearing therefor supported by said frame, a pinion-shaft connected thereto by universal joint, a pinion on said shaft engaging the teeth on said wheel, a bearing-frame for said shaft connected by a ball-and-socket joint to the main frame and having an adjustable pivotal connection to said axle.

12. In a driving mechanism for traction-wheels, the combination with said wheels, of a main frame supported upon journal-bearings mounted upon the axle of said wheels, a driving element pivotally and adjustably supported upon one of said journal-bearings, a driving connection between said element and wheel, and a universal connection between said element and a power-transmission shaft supported by said main frame.

13. In a driving mechanism for a traction-wheel, the combination of wheels, an axle therefor, a journal-bearing mounted on said axle and reduced to form a circular portion, a frame supported thereon, a toothed element meshing with teeth on said wheel and pivotally supported at one end on said reduced portion of the journal-bearing, means to provide for an endwise adjustment between said element and its supporting means, a ball-and-socket joint between said supporting means and said frame, and a universal connection between said element and a power-transmission shaft.

14. In a driving mechanism, a rotatable element, a gear-driving means rigidly connected thereto, a rotating shaft, a support for said shaft which is capable of movement relative to said element, a transmission-gear meshing with said first-mentioned gear and flexibly connected to said shaft, a bearing in which said transmission-gear is mounted which is pivotally supported by said shaft-support and a journal on said rotatable element and capable of endwise adjustment on one of them.

15. In a driving mechanism, the combination of a driving and driven element, a pinion-shaft connected by a universal joint to said driving element, a bearing for said pinion-shaft pivotally mounted concentric with the driven element and radially disposed thereto, a fixed bearing for the driving element, and a ball-and-socket joint between said pinion-shaft bearing and said latter bearing.

16. In a driving mechanism, the combination with a pinion and a shaft therefor, of a rotary element provided with teeth meshing with said pinion, a power-transmission shaft, a universal joint between said shafts, and a bearing for said pinion-shaft having an adjustable connection with the axis of said driven element and a flexible connection with the supporting-frame for said power-transmission shaft.

17. In a driving mechanism, a rotary driving or driven element subjected to changes in its operating position, an axis therefor and a circular row of pinion-teeth mounted thereon, in combination with a journal-bearing mounted on said axis, a pinion-shaft provided with teeth which mesh with said circular row of teeth, a bearing-frame for said shaft which is pivotally mounted on said journal-bearing and capable of an endwise movement thereon, a power-transmission shaft, a fixed bearing-frame therefor and flexible joints between the respective shafts and their bearing-frames.

18. In a driving mechanism, a wheel, a journal therefor, a contact-surface movable with said wheel, a transmission element having a contact-surface engaging said other surface, a shaft, a bearing therefor movable relatively to said journal, a universal joint between said transmission element and shaft, and a bearing for said transmission element pivotally and adjustably supported by said journal.

19. In a driving mechanism, a rotatable shaft, a rotatable element, a transmission device engaging said element and connected by a universal joint to said shaft, and bearings for said shaft and transmission device which are connected by a ball-and-socket joint surrounding said universal joint.

20. In a driving mechanism, a rotatable shaft, a wheel, a journal therefor, a transmission device constituting a driving connection between said shaft and wheel, a bearing-frame for said shaft, a supporting means for said transmission device connected by a ball-and-socket joint to said frame and pivotally supported by said journal, and a universal-joint connection between said transmission device and shaft which is disposed within said ball-and-socket joint.

21. The combination of a wheel and its axle, a frame supported on journal-bearings on said axle, a shaft mounted on said frame, a bearing therefor, driving means for transmitting motion between said shaft and wheel, a supporting-frame for said transmission means flexibly connected to said journal and to said shaft-bearing and capable of endwise adjustment upon one of them.

22. The combination of a wheel and its axle, an engine-supporting frame mounted on journal-bearings on said axle, a shaft, a bearing therefor mounted on said frame, a driving element connected by a flexible joint to said shaft and in operative engagement with means which move with said wheel, a bearing-support for said element, a ball-and-socket joint connecting said support to said shaft-bearing and surrounding said flexible joint, and means to pivotally connect the bearing-support for said element to said axle.

23. In a driving mechanism, the combination of a wheel, a journal therefor, an elastic-fluid turbine, a support therefor capable of movement relative to said journal, a turbine-shaft provided at an intermediate point with a universal joint, an element connected to the flexible end of said shaft and provided with a contact-surface which engages a similar surface carried by an element which drives said wheel, and means to pivotally and adjustably support the flexible end of said shaft on said wheel-journal.

24. In a driving mechanism, the combination with a wheel and a journal therefor, of means to transmit motion to or from said wheel comprising a shaft, a flexible joint between said shaft and a transmission element having a contact-surface in engagement with a surface which moves with said wheel, a bearing for said shaft capable of movement relative to said journal, and means to pivotally and adjustably support an end of said transmission element from said journal.

In testimony whereof I have signed my name to this specification in the presence of two subscribing witnesses.

JAMES WILKINSON.

Witnesses:
  H. M. HORTON,
  R. D. JOHNSTON.